United States Patent [19]

Hoiss

[11] Patent Number: 5,512,142
[45] Date of Patent: Apr. 30, 1996

[54] PROCESS AND DEVICE FOR PURIFYING ORGANICALLY POLLUTED WASTE WATER

[76] Inventor: Jakob Hoiss, Ruffinistr. 8, D-8000 München 19, Germany

[21] Appl. No.: 274,160

[22] Filed: Jul. 14, 1994

Related U.S. Application Data

[63] Continuation of Ser. No. 910,072, Jul. 13, 1992, abandoned.

[30] Foreign Application Priority Data

Nov. 11, 1989 [DE] Germany .......................... 39 37 608.7

[51] Int. Cl.$^6$ .................. B01D 3/10; B01D 3/42
[52] U.S. Cl. .................. 203/10; 202/181; 202/182; 202/197; 203/1; 203/2; 203/11; 203/24; 203/26; 203/DIG. 4; 203/DIG. 18
[58] Field of Search .................. 203/10, 11, 22, 203/26, 24, 1, 2, 3, DIG. 4, DIG. 9, DIG. 25, DIG. 18; 202/181, 182, 197, 200

[56] References Cited

U.S. PATENT DOCUMENTS

| | | | |
|---|---|---|---|
| 2,446,880 | 8/1948 | Kleinschmidt | 203/26 |
| 4,278,502 | 7/1981 | Stevens et al. | 203/100 |
| 4,342,624 | 8/1982 | Chute | 203/1 |
| 4,585,524 | 4/1986 | Hoiss | 203/24 |
| 4,770,748 | 9/1988 | Cellini et al. | 203/DIG. 4 |

FOREIGN PATENT DOCUMENTS

| | | | |
|---|---|---|---|
| 199341 | 6/1908 | Germany . | |
| 964504 | 5/1957 | Germany | 203/DIG. 4 |
| 3937608 | 8/1990 | Germany . | |

*Primary Examiner*—Robert J. Warden
*Assistant Examiner*—Robert Carpenter
*Attorney, Agent, or Firm*—Jones, Tullar & Cooper

[57] ABSTRACT

A process and device for purifying organically polluted waste water utilizing a primary system and a closed secondary system. The primary system includes a first heat exchanger, a second heat exchanger and a cyclone located between the two heat exchangers. The first heat exchanger evaporates the waste water into a waste water vapor and a waste water sump solution. The heat for evaporating the waste water in the first heat exchanger is obtained primarily from raw water in the secondary system. A second heat exchanger in the primary system condenses the waste water vapor and in the process causes evaporation of raw water in the secondary system. The level of waste water in the primary system is monitored as is an operational parameter in the secondary system. With the data obtained from this monitoring, the drawing off of the waste water sump solution is controlled.

20 Claims, 2 Drawing Sheets

PROCESS AND DEVICE FOR PURIFYING ORGANICALLY POLLUTED WASTE WATER

This is a continuation of application Ser. No. 07/910,072 filed on Jul. 13, 1992, now abandoned.

BACKGROUND OF THE INVENTION

The present invention relates to a process and a device for purifying in particular substantially organically polluted waste water.

In connection with a process and a device for distilling raw water, such as is known from DE 26 00 398 C2, a dual cycle system is used, to which a heat pump cycle process is coupled for use as an evaporation process. On the one hand, this has the advantage that it becomes possible to generate a qualitatively high-grade, i.e. highly pure, distillate, such as is demanded in the pharmaceutical, biotechnical and electrotechnical industries and that on the other hand this can be attained in a very efficient manner. In the course of the distillation of raw water the concentrated raw water sump solution is drawn off approximately once a month, which is not mentioned in the noted reference. This is sufficient because of the negligible pollution of the raw water, if it is of drinking water quality, because a dual cycle process is practically not disadvantageously affected during this time. However, this results in a discontinuous process, which is disadvantageous.

In accordance with an article by J. Hoiβ in "Zeitschrift für wirtschaftliche Fertigung" [*Journal of Commercial Manufacturing*], Vol. 79, 1984, pages 141 to 145, tests were performed as to how the process or the device would react, if they or it were used for purifying nitrate-nitrite-containing wash water from hardening factories. The aim of the tests was in particular to determine whether there would be a dependency of the quality of the distillate on the strength of the concentrated nitrate-nitrite-containing wash water sump solution. Because a decrease in the quality of the distillate as a function of this sump solution concentration was found, two possibilities for operating the process were cited in this article, namely continuous operation with approximately ten to fifteen percent sump draw-off or a discontinuous operation up to the point where the sump had been concentrated to the point where the power consumption of the device had reached limit values inherent in the process. The second one of the mentioned possibilities suffers from the above mentioned disadvantage of discontinuity, which implies stopping the device, removal of the waste sump solution, cleaning of the device and possibly removal of deposits on the device. It is also necessary to monitor the quality of the distillate continuously throughout the process so as to be able to stop the process even at an inconvenient time. This is relatively expensive. Although the above mentioned first possibility results in the continuity of the process operation, it requires that such nitrate-nitrite-containing wash waters are always of the same "quality" in order to be able to fix the percentage value of the continuous sump draw-off.

Now, if it is intended to purify or distill industrial waste water, particularly substantially organically polluted waste water, the above mentioned possibilities of working the process cannot be applied easily, not least because the total pollution with chemically oxidizable matter, essentially organic pollution, for the measurement of which the so-called CSB value (value of chemical oxygen demand [COD]) is of importance, can vary considerably. Primarily it must be assumed that a discontinuous operation or processing is out of the question because of the above mentioned disadvantages. The continuous process operation with continuous draw-off of the concentrated waste water sump solution is not practically feasible for the following reasons: Such waste water constitutes a mixture of many materials containing many problem materials with different behavior in addition to water. Such problem materials are, for example, low boiling components, the boiling temperature of which therefore lies considerably below that of water, and foam-generating components, which can make distillation of the waste water questionable. The low boiling components, for example, generate gas and form gas pockets in places where the condensation of the waste water vapor is to take place. The results of this are irregularities in the connected heat pump cycle process, so that the heat balance of the process or in the device is no longer correct because of possible different specific heat transfers in the individual process steps. This can lead to an increase in overheating in the secondary system and thus to too high a temperature, which must result in shutting down the process or the device in order to prevent damage. The foam-generating components of such waste water act in a similar manner, namely because of the fact that they can clog the process step where the waste water evaporates and can paralyze the process step in which the waste water vapor is purified in a cyclone.

SUMMARY OF THE INVENTION

It is therefore the object of the present invention to provide a process and a device of the previously mentioned type for purifying or distilling in particular substantially organically polluted waste water where continuous process operation can be achieved, even with such waste water, with simple process technology.

In a process of the type mentioned, the concentrated waste water sump solution is drawn off as a function of an operational parameter of the secondary system at a time when the latter exceeds a set value range, and the waste water is admitted as a function of the filling height in the primary system; while in the apparatus of the type mentioned includes a first control unit which opens or closes a draw-off opening in the bottom area of the first heat exchanger for drawing off concentrated waste water sump solution as a function of a measured value of an operational parameter of the secondary system, and a second control unit which opens or blocks the admission of waste water as function of a measured value of the filling height in the primary system. Both the process and the apparatus are provided for attaining the noted object.

By means of the steps in accordance with the invention it is possible to maintain a stable process with as constant as possible a quality of the distillate, while maintaining continuous process operation, even with waste water which is organically polluted in different ways. The appropriate operational parameter of the secondary system indirectly detects in an advantageous manner the heat transfer conditions in the primary system which are directly transmitted to the heat pump cycle process, so that the process operation can be adapted to the appearance in greater or smaller numbers of the above mentioned problem materials.

If, for one or more of the previously mentioned reasons, be it that not enough waste water vapor is being generated, the heat balance no longer is correct in the process step of the waste water vapor condensation or the secondary medium evaporation, the mass flow in the secondary system is maintained in that the pressure difference between the inlet and the outlet at the compressor is increased by the latter. This means that it would be possible in principle to measure the differential pressure at the compressor, however, this is relatively complicated and expensive. Because the overheating portion of the secondary medium increases with an increase in the differential pressure, it is practical in accordance with an exemplary embodiment of the present invention to provide that the overheating temperature of the secondary medium at the pressure side of the compressor is used as the operational parameter. A first control unit is connected with an overheating temperature sensor, which is disposed directly at the pressure side of the compressor. Measurement of the overheating temperature is relatively simple and can be performed with cost-effective means.

In connection with an alternative exemplary embodiment of the present invention the current intake of the compressor is used as the operational parameter. The first control unit is connected with a device for measuring the current intake of the electric motor of the compressor. This, too, is a relatively cost-effective possibility wherein it is taken into consideration that the current intake of the electrical drive of the compressor increases with an increase of the pressure difference and thus with an increase in the output.

It is practical, particularly with a large portion of foam-generating components, to provide that the waste water sump solution is drawn off in cycles, preferably in even intervals. The opening and closing of the draw-off opening for the waste water sump solution is preferably cycled in even intervals. By means of this it is prevented that too much new waste water flows all at once into the process and could disturb the process step of waste water evaporation in that not only the heat balance in this heat exchanger is upset because of the foam being generated and deposited on the heat exchanger surfaces, but also that the foam portion carried along in the waste water vapor greatly decreases the quality of the distillate. In addition, such timed intake of waste water to be distilled is also advantageous in view of the stability of the process, because in this way the temperature level does not experience too great break-downs.

Because the components of the concentrated waste water sump solution to be drawn off have the tendency to crystallize, particularly if the process takes place under overpressure, when being discharged into a catch container which is at ambient pressure, it is practical to provide that the draw-off opening is diameter-sized and is connected via a short pipeline with an elutriation container located directly under it in order to prevent that the draw-off opening and/or the pipeline leading to the catch container become clogged.

Particularly if the waste water to be distilled or purified is polluted by a relatively high proportion of inert gases, for example, it is of particular advantage to provide that gases which are not as heavy as the waste water vapor and collect during the waste water condensation at one or a plurality of places unfavorable from the standpoint of flow technology, such as inert gases, are exhausted. The second heat exchanger is provided, at one or a plurality of places unfavorable from the standpoint of flow technology, with an exhaust opening for gases which are not as heavy as the waste water vapor, such as inert gases. By means of this the heat balance in the process step is prevented where the waste water vapor is again condensed and is disturbed because the inert gases are deposited on the heat exchanger surfaces as a kind of heat insulator.

If it can be assumed that the proportion of these lighter gases is large, they can be continuously bled off. However, in this case it is practical to provide that the exhaust of the lighter gases is performed parallel with the draw-off of the waste water sump solution in order to prevent that water vapor is also drawn off in case of a smaller proportion of such light gases, which would reduce the degree of effectiveness of the process. The exhaust opening for the lighter gases is provided with a valve which is connected with the first control unit.

A criterion for letting waste water off into public sewage treatment plants is, beside the sum parameter COD, the limit value of the ammonium content of the waste water. In order to possibly be able to reduce the ammonium content of the distillate, it is of particular advantage to provide that acid aqueous ammonium sulfate solution or aqueous sulfuric acid solution is sprayed into the cyclone in counterflow to the direction of movement of the waste water vapor, particularly independent of the previously mentioned control process. The end of a pipeline provided with a spray nozzle is directed into the cyclone, by means of which acid aqueous ammonium sulfate solution or aqueous sulfuric acid solution can be sprayed in counterflow to the direction of movement of the waste vapor.

Further details of the invention ensue from the following description, wherein the invention is described and explained in detail by means of the exemplary embodiment shown in the drawings. Shown are in:

DETAILED DESCRIPTION OF THE PREFERRED EMBODIMENT

Figure 1:
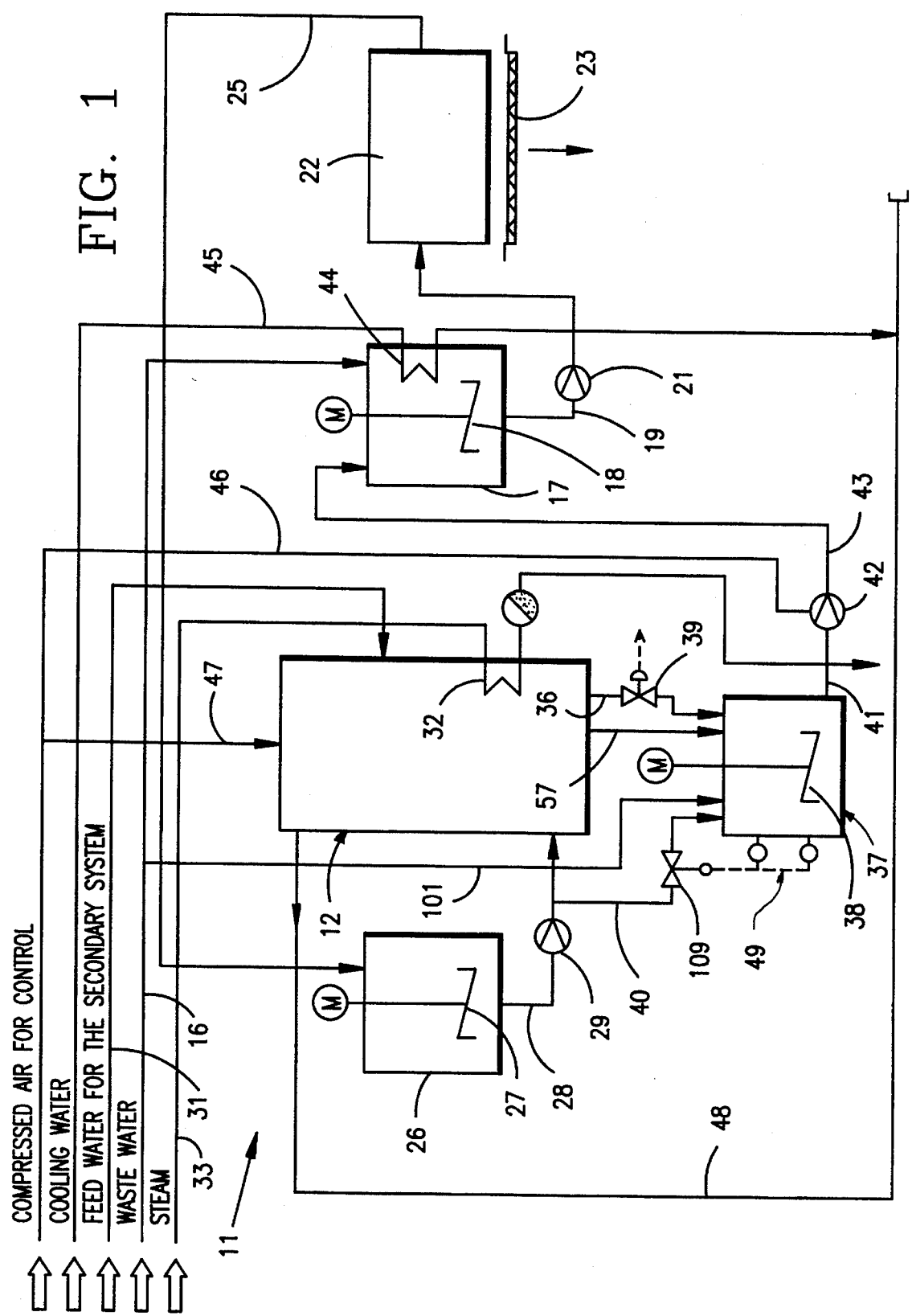
FIG. 1 a flow diagram of a device for purifying or distilling substantially organically polluted waste water in a schematic view, and FIG. 2 that portion of the device in an enlarged view which contains the dual cycle process system, together with an elutriation container.

The device 11 in accordance with a preferred exemplary embodiment shown in the drawings is used for purifying or distilling organically polluted waste water, such as accumulates in relevant industrial plants. In the illustrated exemplary embodiment a dual cycle system 12 having a primary system 13 for the waste water to be treated and a spatially separated closed secondary system 14 which is operated under overpressure are used. It should be understood that it is also possible to use a dual cycle system 12 where evaporation is performed in a vacuum.

In accordance with FIG. 1, waste water to be treated from an industrial installation, not shown, is supplied through a pipeline 16 to a first receiving container 17, which is provided with a motor-driven agitator 18, so that no solid components in the waste water to be treated can be deposited on the container bottom and heat distribution is improved. The waste water is conducted in a pipeline 19 via a pump 21 to a filter press 22, the filter cake 23 of which retains those solids in essentially moist form which can be separated from the waste water by filtration. This filter cake 23 can then be disposed of in a waste dump or can be further treated. Then the filtrate or filtered waste water is conducted through a pipeline 25 to a second receiving container 26, which is also provided with a motor-driven agitator 27. The filtered waste water is fed into the primary system 13 (FIG. 2) of the dual cycle system 12 via an outlet line 28 and a pump 29. Here the waste water has a temperature of approximately 15° to 20° C.

Thus, while the primary system 13 of the dual cycle heat pump system 12 is fed with the filtered waste water to be treated, the closed secondary system 14 (FIG. 2) is connected with a closable pipeline 31 for supplying feed water as the secondary medium. As will be shown later, an external heater 32 is installed in the primary system 13, which in the exemplary embodiment shown is supplied with heating steam via a pipeline 33. It is understood that the external heater 32 can also be operated electrically.

The primary system 13 of the dual cycle system 12 has been provided on the bottom with a closable outlet pipeline 36 leading into an elutriation container 37, which is provided with a motor-driven agitator 38. Concentrated waste water sump solution from the primary system 13 reaches the elutriation container 37 via the outlet pipeline 36 in a controlled manner, using the valve 39 the solution being more than 100° C. hot in the exemplary embodiment shown. Via a branch line 40 of the pipeline 28, which is provided with a valve 109, this hot, concentrated waste water sump solution is mixed with filtered waste water in the elutriation container 37, so that a waste water solution of less than 100° C. is to be transported at the outlet side. For this purpose the valve 109 is controlled by a combined temperature/fill level control 49. At the outlet side of the elutriation container 37, which is provided with an exhaust line 41, this waste water solution is conducted, by means of a pump 42 driven by compressed air from a pipeline 46, through a pipeline 43 to the first receiving container 17 and is mixed there with "fresh" waste water from the pipeline 16 and together with it again conducted to the filter press 22. Cooling water is delivered to the elutriation container 37 via line 101. A cooling device 44 is provided in the first receiving container 17, which is supplied with cooling water via a pipeline 45. Compressed air is supplied via the pipeline 46 to the pump 42 which is driven by the compressed air. A branch line 47 is connected to the dual cycle heat pump system 12 for its pneumatic air control.

The distillate of the purified or distilled waste water available at the outlet of the primary system 13 of the dual cycle system 12, is supplied via an outlet line 48, in which in the exemplary embodiment the cooling water line 45 of the cooling device 44 terminates, either to a waste water conduit or to the industrial process as reusable raw water. In this case the distilled water has a COD (chemical oxygen demand) value which complies with the requirements of the law. Alternatively, the cooling water in the cooling water line 45 can also be returned to the cooling water cycle.

The mode of operation of the dual cycle 12 will be described below by means of FIG. 2. The waste water entering the primary system 13 through the pipeline 28 is preheated in a pre-heat exchanger 51 to slightly below the distilling temperature in counterflow to the distillate coming out of the outlet line 48. In this case the pre-heat exchanger 51 is embodied as a spiral-shaped double tube heat transfer device. From the pre-heat exchanger 51, the filtered waste water reaches a sump area 53 of a first heat exchanger 52 which operates as an evaporator in the primary system 13. The external heater 32, which essentially is only used for starting up the process from the cold state, is disposed in the sump area 53 of the first heat exchanger 52. From the sump area 53 the waste water to be treated rises into the evaporation area 54 of the first heat exchanger 52, which is embodied in the form of a corrugated surface evaporator. The waste water vapor or distillate vapor generated in the tubes of the evaporation area 54 of the first heat exchanger 52 rises upwards and passes through a cyclone 56, in which the separation of droplets and particles carried along takes place on the basis of very high centrifugal acceleration of the vapor. Because of a physical effect, a water film is formed between the inner cyclone wall and the distillate vapor, which has the advantage of binding all droplets and particles which were centrifuged out and even preventing contact of the distillate vapor with the wall. Since the water film wanders into the lower part of the cyclone because of the interior flow field, it does not reach the distillate. The collecting water is moved away through a pipe 57 on the bottom and returned to the elutriation container 37. At the critical points of the highest speeds, the distillate vapor itself does not come into contact with the metal surface, instead it reaches a second heat exchanger 62, which operates as a condenser in the primary system 13, through the immersion pipe 58 disposed in the center of the cyclone 56. As partially shown in FIG. 2, this second heat exchanger 62 is embodied in the form of a corrugated surface evaporator/condenser, where the vapor exiting the cyclone 56 flows, after a change of direction of 90°, through gaps 61 between upright corrugated surface plates 64 and condenses in the course of this. The condensate, in the form of waste water distillate, leaves the primary system 13 through the pre-heat exchanger 51 and the outlet line 48.

The condensation heat of the primary medium (waste water to be purified or waste water vapor) being liberated in the primary system 13 at the second heat exchanger 62 operating as a condenser is used to perform here in the secondary system 14 the evaporation of the secondary medium, in this case raw water. The raw water vapor generated in the secondary system 14 is conducted via a conventional mist collector, not shown, from the upper part of the dual cycle system 12 into a compressor 66, which is electrically driven. Compression and a temperature increase connected therewith takes place in the compressor 66. The vapor of the secondary medium leaving the compressor is sufficiently hot to serve essentially as the only heating medium for evaporating the pre-heated filtered waste water in the first heat exchanger 52, which operates as an evaporator in the primary system 13. In this operational state energy supplied by means of the external heater 32 is only required to cover the heat loss because of the hot, elutriated waste water sump solution. By means of the condensation of the vapor of the secondary medium in the first heat exchanger 52, the waste water is evaporated in the latter. The generated condensate of the secondary medium leaves the first heat exchanger 52 and reaches the upper heat exchanger 62, which operates as an evaporator in the secondary system 14, via a pipe 68 and a throttle valve 65. The condensate of the secondary medium flows into a bottom area of the second heat exchanger 62 and flows in the form of vapor vertically upwards through the tube chambers 63 of the corrugated surface plates 64 into a catch chamber 70 and from there back to the compressor 66 via the pipe 67. It is understood that the two systems 13 and 14 are completely separated from one another and that the illustrated corrugated surface plate heat exchanger 62 is embodied in a corresponding manner. Even though illustrated in a schematically different manner, the first heat exchanger 52 can also have such a structure.

Because the waste water to be purified or distilled is substantially organically polluted and therefore represents a mixture of many materials containing different problem materials, such as low boiling components, foam-generating components, etc., the device 11 is provided with a control device 71 allowing continuous process operation regardless of how high the organic pollution is and which problem materials are contained in it and in what amounts. For this purpose a first control unit 72 is provided, which is connected on the one side with an overheating temperature sensor 73 and on the other with a drive 74 of the valve 39 in the outlet pipeline 36. The temperature sensor 73 detects the overheating temperature of the secondary medium in the secondary system 14 at the pressure side of the compressor 66, while the valve 39 permits the draw-off of concentrated waste water sump solution from the sump area 53 of the first heat exchanger 52 when, for example, the waste water sump solution is concentrated to such a degree that the desired evaporation values of the waste water are no longer attained. This amount of waste water vapor is a measurement for the function of the second heat exchanger 62 and in this way of the operational state of the secondary system 14, the reduced mass flow of which during a deterioration of heat transfer must be compensated by a pressure increase of the compressor 66, which results in an increase in the overheating temperature at the pressure-side outlet of the compressor 66. For this reason the temperature sensor 73 is disposed directly at the pressure outlet of the compressor 66. If therefore the overheating temperature is increased above a desired set value or set value range, the first control unit 72 will trigger the drive 74 of the valve 39 as a function of this increase, and open the latter for drawing off waste water sump solution. Alternatively, the current intake to the compressor 66 can be measured by a sensor 75 and this data used for controlling the operation of the valve 39. In either case the opening of the valve 39 takes place in cycles, preferably in even, short intervals. The pipeline 36 provided with the valve 39 is diameter-sized is as short as possible and terminates in a straight line in the elutriation container 37 located directly under the sump area 53 of the first heat exchanger 52.

Figure 2:
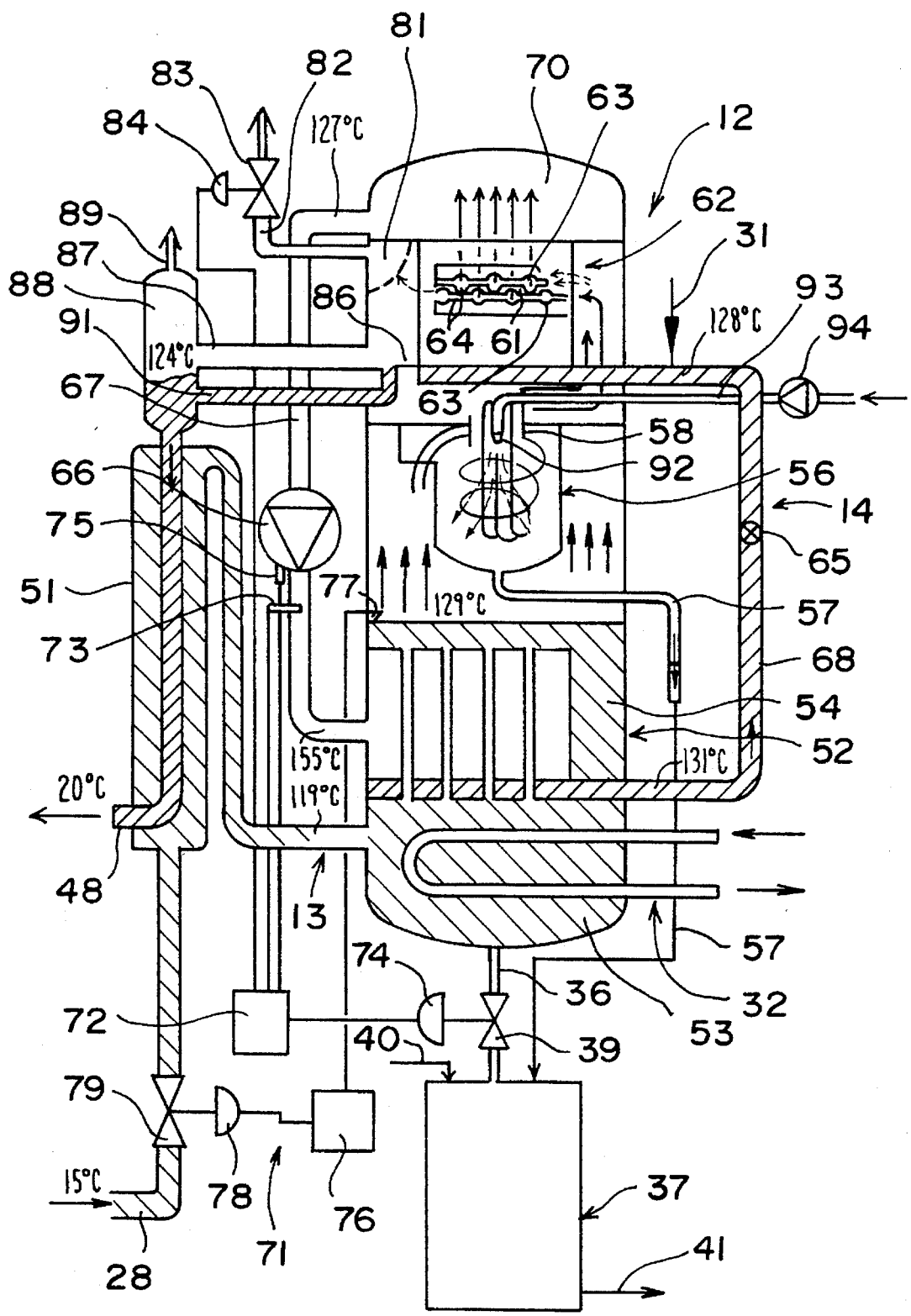

The control device 71 has a second control unit 76, one side of which is connected with a fill level sensor 77 and on the other with the feed pump 29 for the waste water to be distilled and/or, in accordance with FIG. 2, with a drive 78 of an inlet valve 79 in the inlet line 28. The second control unit 76 is used, on the one hand, to make possible the inflow of waste water to be distilled at a time when a corresponding amount of waste water has evaporated in the first heat exchanger 52; but it is also used to bring the fill level of the waste water in the first heat exchanger 52 to the desired value at a time when concentrated waste water sump solution has been drawn out off the sump area 53 of the first heat exchanger 51. The second control unit 76 is also embodied such that it opens and closes the inlet valve 79 (or the pump 29) in cycles, preferably in even, short intervals. On the one hand, the result of this is that the heat balance within the primary system 13 or the entire dual cycle system 12 remains without great changes, and on the other hand, that the foam-generating components in the waste water to be distilled cannot generate foam within the first heat exchanger 52 to such an extent, that it could disturb the heat balance in the system and/or the fill level measurement. Thus, when the first control unit 72 is in operation and opens and closes the valve 39 in cycles, the second control unit 76 will follow it immediately and make possible a cyclic inflow of the waste water to be purified.

Normally, more or less large amounts of low boiling components, such as inert gases, are present in the organically polluted waste water. These gases, which are lighter than water vapor, will precipitate out during condensation of the waste water vapor in the second heat exchanger 62 and will be deposited in a place which is unfavorable from the viewpoint of flow technology, for example the one designated by 81. If such gas pockets 81 increase, they are disadvantageous for the heat balance of the second heat exchanger 62, because these light gases are deposited on the heat exchanger surfaces of the second heat exchanger 62 like a heat insulator. An exhaust line 82 is provided in this area 81 to prevent this. This exhaust line 82 can be continuously open. However, in the exemplary embodiment a valve 83 is provided, the drive 84 of which is connected with the first control unit 72. Because a deterioration of the heat balance of the primary system 13 and with it also of the secondary system 14 is not only dependent on the concentration of the waste water sump solution, but also can be dependent on the extent and size of the gas pockets 81, it is attained with this that the gas pocket(s) 81 are also exhausted when an instability in the heat balance on account of an increase of the overheating temperature in the secondary system 14 has been detected. In a practical manner this exhausting process takes place continuously over a defined period of time.

Those gases which are heavier than water vapor will collect at the bottom 86 of the second heat exchanger 62 together with the condensing water vapor and will not again become dissolved in the water distillate because of the high temperature of the latter of for example 124° C. In the manner shown, the gases will flow via an upper line 87 into an intermediate container 88 and will be continuously exhausted through an outlet 89, while the distillate can flow off via a lower line 91 into the intermediate container 88 and from there into the outlet line 48.

A criterion for letting waste water off into public sewage treatment plants is, beside the sum parameter COD, additionally the limit value of the ammonium content of the waste water. To reduce the ammonium content in the distillate, for example an acid aqueous ammonium sulfate solution or aqueous sulfuric acid solution or the like is sprayed, preferably continuously, in counterflow to the direction of movement of the waste water vapor into the immersion pipe 58 of the cyclone 56 by means of a pump 94 via a pipeline 93, on whose end, which is disposed in the immersion pipe 58 of the cyclone 56, a nozzle 92 is disposed.

The ammonia or ammonium contained in the waste water vapor (in water droplets) comes into contact with the sprayed in solution in this manner and is spun towards the cyclone walls together with it. Salt solutions are formed through the reactions taking place in the course of this. These are conducted out of the cyclone via the pipe 57 on the bottom either simply to the outside or again into the elutriation container 37. The ammonium content in the distillate is reduced by the amount of ammonium removed. Such washing of the waste water vapor exiting the cyclone is also possible independently of the further control steps of the invention.

The process of the invention and the device 11 of the invention have been described by means of a dual cycle system 12, where the evaporation and condensation steps take place under overpressure. It should be understood that vacuum evaporation can also be used for the purification or distillation of substantially organically polluted waste water. For detecting an operational parameter in the secondary cycle 14, which parameter indicates instability of the process in the primary system and thus in the secondary system, it is possible to choose the power intake of the electrical drive of the compressor 66, instead of the overheating temperature. Thus it is possible to connect the first control unit 72 with a measuring device for measuring the current intake of the electrical compressor drive, instead of with an overheating temperature sensor.

I claim:

1. A process for purifying organically polluted waste water comprising the steps of:

providing a primary treatment system and a separate secondary system, said primary treatment system including a waste water flowpath, a first heat exchanger in said waste water flowpath, a second heat exchanger downstream of said first heat exchanger, and a means for detecting the level of a waste water sump solution; said secondary system including a raw water inlet, an opposite side of said first heat exchanger, an opposite side of said second heat exchanger, means for heating the raw water, and a means for detecting an operational parameter of the secondary system;

heating the raw water to form raw water vapor;

evaporating a portion of the waste water primarily by indirect heat exchange with said raw water vapor in the first heat exchanger to form waste water vapor and a waste water sump solution, the level of which varies;

condensing the waste water vapor and evaporating the raw water during condensation of the waster water vapor in the second heat exchanger;

detecting the level of the waste water sump solution;

detecting an operational parameter of the second system;

admitting waste water to the primary system as a function of the detected level of the waste water sump solution; and drawing off waste water from the waste water sump solution as a function of the detected operational parameter of the secondary system when the detected value exceeds a set value.

2. The process as defined in claim 1, wherein said means for heating in the secondary system includes a compressor having raw water vapor at its pressure side, and wherein the operational parameter of the secondary system is the temperature of the raw water vapor at the pressure side of the compressor.

3. The process as defined in claim 1, wherein said means for heating in the secondary system includes a compressor having a current applied thereto, and wherein the operational parameter of the secondary system is the current applied to the compressor.

4. The process as defined in claim 1, wherein the waste water from the waste water sump solution is drawn off in repeated time intervals.

5. The process as defined in claim 4, wherein the repeated time intervals are at even intervals.

6. The process as defined in claim 1, further comprising the step of:

exhausting gases generated during the waste water condensation which are not as heavy as the waste water vapor.

7. The process as defined in claim 6, wherein the exhausting of the gases and the drawing off of waste water from the waste water sump solution occur simultaneously.

8. The process as defined in claim 1, wherein the primary system includes a cyclone, the process further including the step of:

spraying an acid aqueous ammonium sulfate solution into the cyclone in counterflow to the flow direction of the waste water vapor.

9. The process as defined in claim 1, wherein the primary system includes a cyclone, the process further including the step of:

spraying an aqueous sulfuric acid solution into the cyclone in counterflow to the flow direction of the waste water vapor.

10. A device for purifying organically polluted waste water, comprising:

a primary treatment system for the waste water, said primary system including a first heat exchanger for evaporating a portion of the waste water to form into a waste water vapor and a waste water sump solution, the level of which varies, a second heat exchanger downstream of said first heat exchanger for condensing the waste water vapor, and a cyclone located between the first and second heat exchangers;

a closed secondary system including a compressor, said secondary system being coupled to said primary system by said first and second heat exchangers;

a first control unit for detecting an operational parameter of said secondary system indicative of a condition of the raw water and controlling draw off of waste water sump solution from said primary system as a function of the detected operational parameter of the secondary system when the detected value exceeds a set value; and a second control unit for detecting the level of the waste water sump solution and controlling admission of waste water to said primary system as a function of the detected level of the waste water sump solution.

11. The device as defined in claim 10, wherein said first control unit includes an overheating temperature sensor located directly at the pressure side of said compressor.

12. The device as defined in claim 10, wherein said first control unit includes a device for measuring the current intake of an electric motor operatively associated with said compressor.

13. The device as defined in claim 10, wherein the waste water from the waste water sump solution is drawn off in repeated time intervals.

14. The device as defined in claim 13, wherein the repeated time intervals are at even intervals.

15. The device as defined in claim 10, further comprising:

an elutriation container located below a sump containing the waste water sump solution; and pipeline means connecting the elutriation container to the sump.

16. The device as defined in claim 10, wherein said second heat exchanger, includes at least one opening for exhausting gases which are lighter than the waste water vapor.

17. The device as defined in claim 16, wherein the gases are inert.

18. The device as defined in claim 16, wherein said first control unit includes a valve for controlling said at least one opening for exhausting gases.

19. The device as defined in claim 10, further comprising:

means for spraying an acid aqueous ammonium sulfate solution into the cyclone in counterflow to the flow direction of the waste water vapor.

20. The device as defined in claim 10, further comprising:

means for spraying an aqueous sulfuric acid solution into the cyclone in counterflow to the flow direction of the waste water vapor.

* * * * *